United States Patent [19]
Hunnicutt

[11] 3,898,742
[45] Aug. 12, 1975

[54] HEADLIGHT TESTING APPARATUS
[76] Inventor: Wayne E. Hunnicutt, Rt. 1, Box 445, Big Bend, Wis. 53103
[22] Filed: Feb. 19, 1974
[21] Appl. No.: 443,868

Related U.S. Application Data
[63] Continuation of Ser. No. 171,873, Aug. 16, 1971, abandoned.

[52] U.S. Cl. .................................. 33/288; 33/335
[51] Int. Cl. ............................................ G01c 15/12
[58] Field of Search ............................. 33/288, 335

[56] References Cited
UNITED STATES PATENTS

| | | | |
|---|---|---|---|
| 2,609,611 | 9/1952 | Dickson | 33/335 |
| 2,778,116 | 1/1957 | Reuss | 33/298 |
| 2,831,262 | 4/1958 | Falge et al. | 33/335 |
| 2,867,910 | 1/1959 | Falge | 33/301 |
| 2,913,824 | 11/1959 | Drennan | 33/288 UX |
| 2,913,825 | 11/1959 | MacMillan | 33/288 |
| 2,940,174 | 6/1960 | Shoemaker | 33/288 |

Primary Examiner—William D. Martin, Jr.
Attorney, Agent, or Firm—Roy E. Petherbridge; Robert L. Lindgren; Edward D. Gilhooly

[57] ABSTRACT

An apparatus for testing the adjustment of a headlight on a vehicle to determine if the beam is properly directed and to indicate the amount of adjustment needed to achieve a desired alignment. The apparatus includes a pair of devices for attachment to respective headlamps permitting the alignment to be accomplished while the devices remain attached. To effect the testing of adjustment, a sight system and a spirit level is provided in each device. The devices are attached to respective headlights through use of a vacuum system including a suction cup member.

14 Claims, 13 Drawing Figures

PATENTED AUG 12 1975  3,898,742

SHEET 1

INVENTOR
WAYNE E. HUNNICUTT
BY Petherbridge, O'Neill &
Lindgren
ATTORNEYS

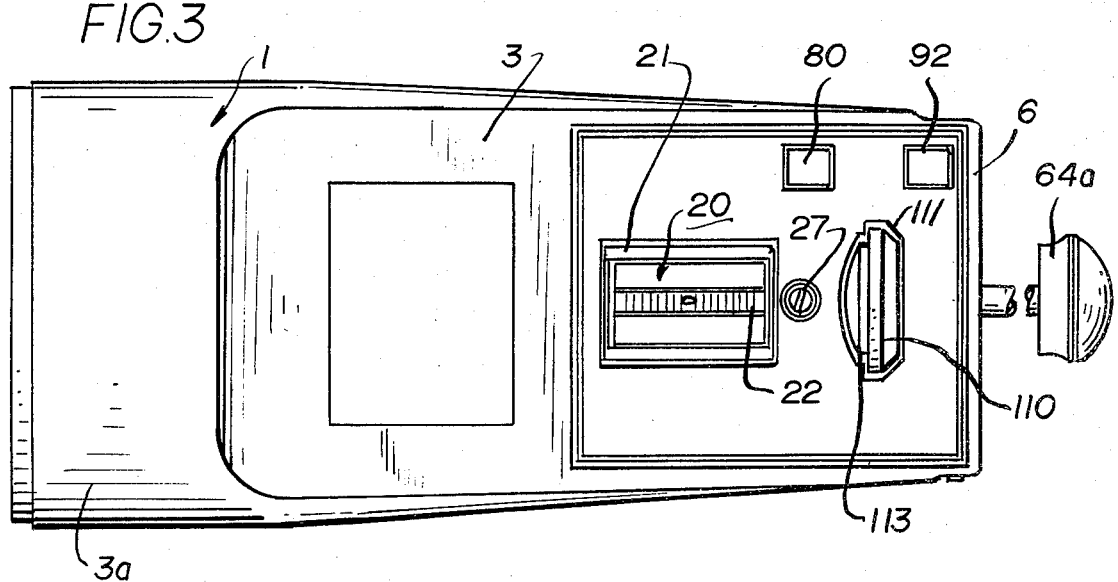
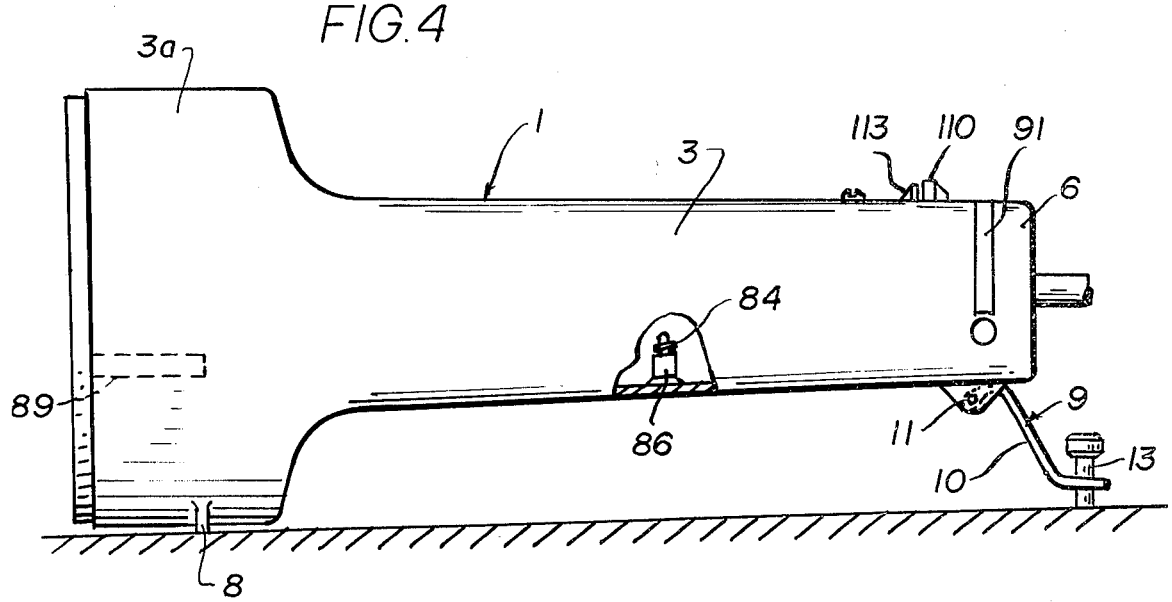
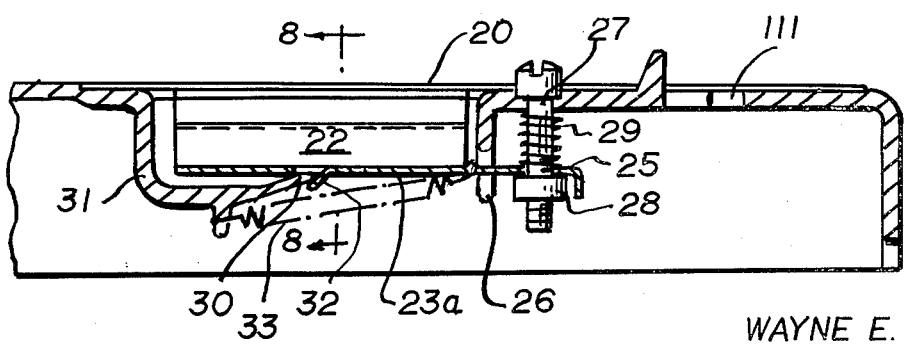

HEADLIGHT TESTING APPARATUS

This is a continuation, of application Ser. No. 171,873, filed Aug. 16, 1971, now abandoned.

BACKGROUND OF THE INVENTION

This invention relates in general to geometrical instruments and in particular to an apparatus for testing the adjustment of a headlamp of a vehicle.

More specifically, the invention relates to a headlight aiming apparatus which includes two complimentary instruments that are adapted to be attached to the lenses of respective headlights of a vehicle to determine whether any misalignment of the aim of the beam is present and to effect realignment of the headlamp if desired. A suction cup and vacuum assembly is included on each of the devices to permit attachment of the instruments to the lens of the headlamp. A pair of sight means are utilized on each of the devices to permit respective calibration of the instruments according to the slope of the ground on which the vehicle is resting for accurate adjustment of the headlamp in a vertical plane and detection of the sideway or horizontal adjustment thereof.

For both safety reason and proper illumination of a road or highway, it is desirable that the headlights of a vehicle such as an automobile be aimed in a selected direction in both a horizontal and vertical plane. In practice, it is common for the left headlight of an automobile, for example, to be oriented differently in a horizontal plane than the other one or more headlights and often it is desirable that both headlights beams be directed downwardly. Due to the influence of various factors during operation of a vehicle, the original orientation of the beam of a headlight may become altered to create an undesirable misalignment which should be detected for corrective adjustment of the position of the headlight relative to the vehicle. In addition, it is necessary that the positioning and alignment of a new headlight be checked as it is being installed on a vehicle.

Many techniques have been employed in the prior art to test whether the orientation of a headlight on a vehicle is in a proper aimed adjustment. Some types of the previous devices for aiming headlight have employed photocell elements which require that the light of headlamp actually be turned on and directed towards the testing apparatus. Such apparatus utilizing photocell elements to detect and aim the direction of a headlight beam are relatively expensive in cost and require frequent maintenance and adjustment.

Other headlight aimers have utilized a combination of spirit levels and physical connecting means which couple respective instruments mounted on each of the headlights. These devices are inconvenient to operate and may result in relatively inaccurate aiming of the headlamps. Still other headlight aimers have attempted to utilize various optical systems whereby the aim of the headlights are checked by the operator viewing various targets and the like. Many optical devices heretofore utilized have relied upon complicated optical lens and movable mirror systems which are not only difficult to operate but are relatively costly to manufacture. Therefore, it is desirable to provide an inexpensive headlight aimer which effectively tests the adjustment of a headlight with a minimum of difficulty by an operator.

SUMMARY OF THE INVENTION

It is, therefore, an object of this invention to improve the testing of the adjustment of a headlight on a vehicle.

Another object of this invention is to reduce the complexity of an apparatus for aiming headlights.

A further object of this invention is to properly aim the headlamps regardless of the slope of the surface on which the vehicle rests.

Still another object of this invention is to minimize the cost of an apparatus for effectively aiming the direction of the beam of a headlight.

These and other objects are attained in accordance with the present invention wherein there is provided an apparatus for aiming the headlights of a vehicle. The apparatus herein disclosed includes a pair of devices which are adapted to be mounted upon the lens of respective headlights. Each of the instruments includes a pair of sight means utilizing a sloped mirror and viewing windows without requiring the use of expensive lenses. One of the sight means performs the function of effecting adjustment of a spirit level mounted on each of the devices according to ground level for precise vertical aiming of the beam while the other sight means is used to view the opposite instrument mounted on the other headlight for proper sideway testing.

The initial calibration of each of the devices according to the ground slope is accomplished by use of one of the sight means wherein the other device is viewed to adjust a spirit level until the bubble thereof indicates a level condition. Thus after adjustment, the devices are positionable in proper calibration to the slope of the ground. Accordingly, after being positioned on the headlamp, any depression or upward orientation of the lamp is noted by the number of degrees that the bubble of the level indicates whereby the lamp may be physically adjusted relative to the vehicle until the desired vertical adjustment is accomplished. The other sight system of each device is utilized to laterally view a target on the device mounted on another headlight whereby the deviation of the targer from view indicates the difference between the actual aim of the beam and a selected aim direction. The headlight apparatus of the invention utilizes a minimum of mechanical elements without the necessity of relying on costly optical lenses, photocells or cumbersome physical elements to interconnect the respective devices mounted on the headlights. Therefore the apparatus of the invention accomplishes improved headlight aiming with a device which is relatively inexpensive and readily operated.

DESCRIPTION OF THE DRAWINGS

Further objects of the invention together with additional features contributing thereto and advantages accruing therefrom will be apparent from the following description of an embodiment of the invention when read in conjunction with the accompanying drawings wherein:

FIG. 3 is a top schematic illustration of one of the headlight testing instruments of the apparatus of the invention;

FIG. 4 is a side schematic illustration of the headlight testing instrument of FIG. 3 with parts broken away;

FIG. 7 is an enlarged partial schematic side illustration of the spirit level assembly of the instrument of FIG. 3;

DESCRIPTION OF THE PREFERRED EMBODIMENTS

Figure 1:
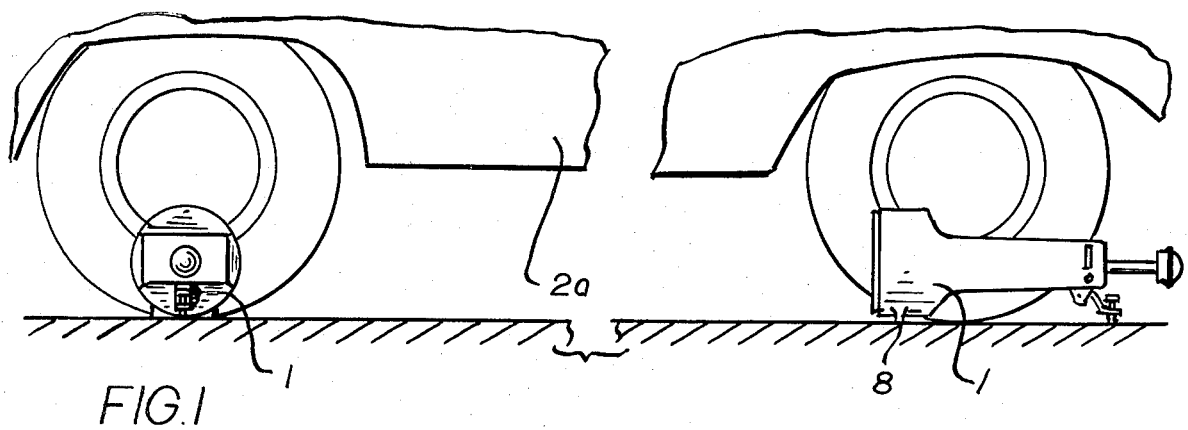
FIG. 1 is a schematic side illustration of the headlight testing apparatus of the invention in operative position for calibration according to ground slope.
Figure 2:
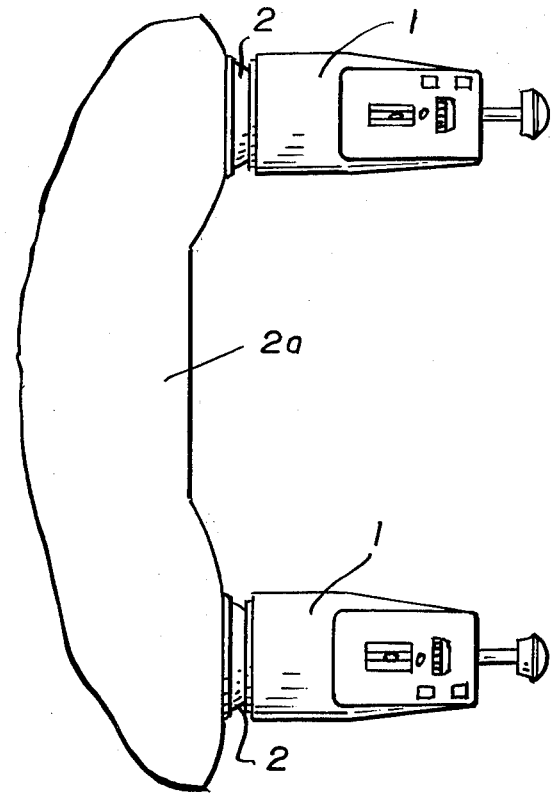
FIG. 2 is a top schematic plan illustration of the headlight testing apparatus of the invention in operative position upon a vehicle having headlights to be tested.

Referring now to FIGS. 1 and 2 there is illustrated the headlight testing apparatus of the invention respectively shown in FIGS. 1 and 2 in operative position for calibration and in position for testing and aligning the aim of headlamps on a vehicle. The calibration procedure and the operation of the headlamp apparatus as shown in FIGS. 1 and 2 will be described in detail later. In typical operation of the apparatus two nearly identical instruments 1 are utilized in conjunction with the headlamps 2 of a vehicle 2a being tested.

Referring now to FIGS. 3, 4, 5, and 6 there is illustrated one of the instruments of the headlight testing apparatus of the present invention. Each of the instruments includes a hollow housing 3 constructed of suitable material such as a high impact plastic and which may, for example, be formed with upper and lower sections interconnected by suitable attachment means. One end of the device includes a cylindrical enlarged portion 3a which generally possesses a larger diameter than headlight 2 being tested. The enlarged section 3a is adapted to be attached in abutting contact to the aiming pads 5 provided on a conventional headlamp. The center portion and other end 6 of the housing may be formed with any desired cross sectional shape.

The enlarged portion 3a of the housing is formed with a pair of legs 8 which extend downward adjacent the bottom of the external surface thereof to provide a support means when the instrument is placed upon a support surface. As best shown in FIG. 4, the other end 6 of housing includes an adjustable support 9 having a leg 10 which is pivotally attached by a pin to a bracket 11 secured to the bottom of. The opposite end of leg 10 includes a screw 13 inserted in a hole in the leg wherein the screw may be rotated to cause pivotal or rocking movement of the headlight aimer instrument about legs 8 when resting on a support surface. The pivotal attachment of leg 10 to bracket 11 permits the leg to be swung underneath the instrument while the device is in an operative position attached to a headlamp or during storage. The position of leg 10 as shown in FIG. 4 is utilized for calibration purposes of the instrument while it is in the position shown at the right in FIG. 1.

Figure 8:
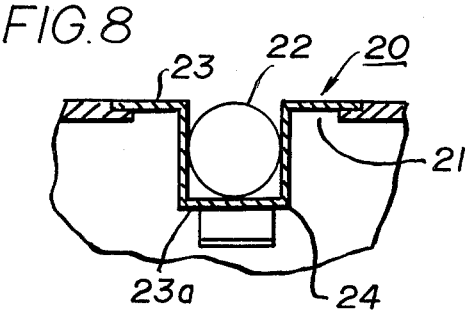
FIG. 8 is an end sectional illustration taken along line 8—8 of the spirit level of FIG. 7.

Referring now to FIGS. 3, 7 and 8, there is illustrated the spirit level assembly 20 mounted in the upper surface of housing. An opening 21 is provided on the upper section of the housing wherein the spirit level assembly 20 is mounted therein with a spirit level 22 being exteriorly visible with its longitudinal axis extending parallel to the longitudinal axis of the instrument. The spirit level 22 comprises any conventional level having calibrations which may be calibrated, for example, in inches of deflection at 25 feet from a zero position at approximately the longitudinal midpoint thereof. As best shown in FIG. 8, the spirit level is mounted within a support member 23 having a length substantially equal to the spirit level and having a Ushaped cross-section 24 to receive and support the level. The level support member is adapted to be secured into opening 21 of the top of the housing to maintain the level in proper lateral alignment with the longitudinal axis of the instrument.

The level support means 23 as illustrated in FIG. 7 inches a longitudinally extending projection 25 from base portion 23a to point beyond a downwardly wall 26 formed in housing 3 adjacent opening 21. A hole receiving a screw 27 is formed at the end of projection 25 whereby the screw extends through the hole and an aligned hole in the top of housing 3. The screw interengages a nut 28 which is in contact with the bottom surface of projection 25 to effect a desired upward or downward movement of the end of the projection as the screw 27 is rotated in a selected direction. A conventional compression spring 29 is interposed between the top of projection 25 and the interior of the housing 3 in surrounding to the shaft of the screw to provide a sufficient bias force therebetween.

The bottom portion 23a of level support member 23 bears against an edge 30 of a second downwardly bent portion 31 of the housing adjacent opening 21. Portion 31 includes two substantially 90° bends wherein edge 30 projects upward from the lower section thereof. It should be apparent that such a support of member 23 at its midportion permits swinging movement of the level about edge 30. The bottom support member 23 includes a lip 32 which inter-engages edge 30 to insure adequate securement of the elements. Thus rotation of screw 27 in a selected direction causes a swinging movement of the level 22 in a vertical plane along the longitudinal axis of the spirit level. To further bias the swinging movement of the level and support member, a tension spring 33 is coupled between a tab on bent portion 31 of the housing and projection 25 adjacent the outer end of support member 23.

Figure 6:
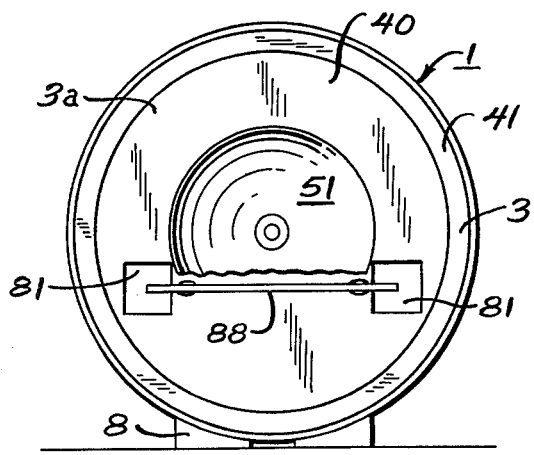
FIG. 6 is an end schematic illustration of the instrument of FIG. 3 viewed from the left thereof.

Each of the instruments 1 of the headlight apparatus of the invention is adapted to be attached to the respective headlights of a vehicle such as the right and left lamps as shown in FIG. 2. Enlarged end 3a of the housing is adapted to be attached to the lens of the headlight in a manner such that the longitudinal axis of the instrument is codirectional with the longitudinal axis of the headlamp. Referring to FIG. 6, there is illustrated enlarged end 3a of the housing which receives a circular cup shaped member 40 inserted into securement therewith by any suitable technique. A flange 41 is formed on the end of cup 40 wherein the flange forms an abutment surface which extends in a plane perpendicular to the longitudinal axis of the instrument. The abutment surface is positioned at a point adjacent the end of the housing. The location of flange 41 is selected so that when enlarged end 3a is placed over the lens of the headlamp, the abutment surface 41 directly contacts aiming pads 5 shown in FIG. 10 conventionally provided in headlamps now being utilized. Generally, three pads are utilized in modern headlights and the abutting of flange 41 on the aiming pads allows the longitudinal axis of the instrument to coincide with the longitudinal axis of the headlamp for accurate testing of the adjustment thereof.

Figure 9:
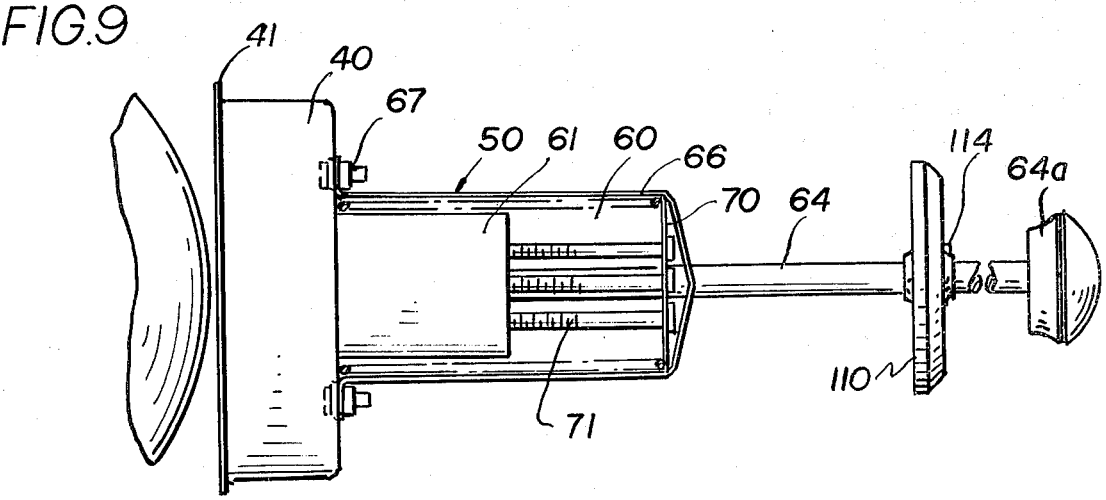
FIG. 9 is a top schematic illustration of the vacuum assembly mechanism of the headlight instrument of FIG. 3 adjacent a lens of a headlamp.
Figure 10:
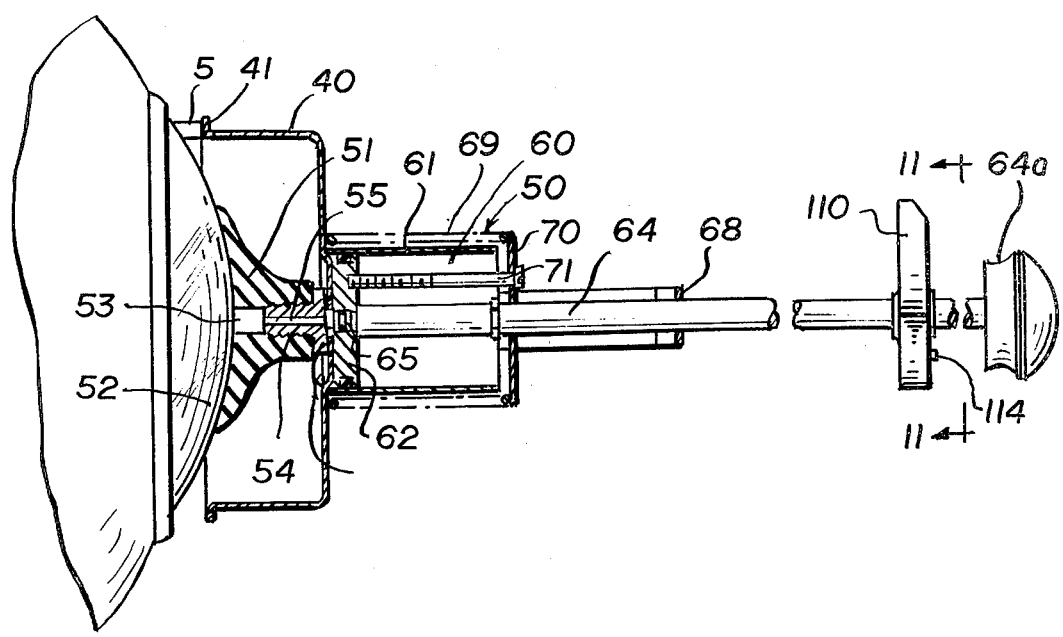
FIG. 10 is a sectional schematic side illustration of the vacuum assembly of FIG. 9.

Referring now to FIGS. 9 and 10, there is illustrated the vacuum assembly 50 for maintaining the abutting flange 41 in secure abutment with the headlamp pads during testing operations. The vacuum cup assembly 50 includes a vacuum cup 51 which is attachable to the lens of the headlamp in a manner to prevent relative movement between the instrument and the lamp. Vacuum cup 51 comprises a member having a concave face 52 and which is constructed from a material such as a flexible rubber. The vacuum cup includes a central opening 53 which receives a hub member 54 having a serrated surface to securely engage the vacuum cup for a portion of the length of the central opening 53. Hub member 54 includes a flow passage 55 to provide fluid communication between the face of vacuum cup 51 and thru the hub member. Hub member 54 is partially inserted through a central opening 56 provided thru the back of cup member 40 and is secured to the member 40 by deforming a portion of hub 54.

A vacuum cup actuator assembly 60 is positioned on the back side of the cup member 40 in fluid communication to flow passage 55. The vacuum cup actuator assembly includes a cylinder 61 having a piston 62 mounted therein for movement along the longitudinal axis of the instrument. An end of the cylinder 61 contacts a raised portion of the back of the cup member 40 in a manner that a sealing relationship exists between the wall of the cup member and the end of the cylinder. A vacuum cup actuator shaft 64 is attached by any suitable technique such as force fit to the center of piston 62 by means of a projection 65 of the shaft which extends in sealing relationship to a hole formed through the center of the piston. Shaft 64 is made of a suitably strong material and extends the length of instrument 1 to exit through a hole at the opposite end 6 of housing 3. A handle 64a is attached to the end of the shaft to actuate the vacuum cup assembly in a manner to be described in detail later.

Vacuum cup actuator assembly 60 further includes a bracket member 66 which is oriented in a substantial horizontal plaane when the instrument is placed in an operative position and the bracket is in the form of a loop of flat metal material. The ends of the bracket are angularly bent from the midportion thereof to lie flush against the back wall of cup member 40 and are secured thereto by means of bolt and nut elements 67. The bracket member 66, possessing a U-shaped configuration, is situated in surrounding relation to the cylinder 61 and includes a hole 68 through which handle 64 passes. A conventional compression spring 69 is interposed between a plate 70 slidably mounted on shaft 64 and the back of cup 40 to provide a biasing force therebetween. The movement of plate 70 is effected by coupling the plate 70 to piston 62 by means of elongated screw members 71 as best shown in FIG. 10. Thus, movement of actuator shaft 74 causes simultaneous movement of piston 62 and plate 70.

As shown in FIG. 9, the vacuum actuator is illustrated with the piston 62 and other elements in an outward position while FIG. 10 shows the piston when the shaft 64 is pushed inward toward a headlamp lens. In operation, the suction cup of each of the instruments is placed adjacent the lens of the headlamp with the flange 41 in abutment to the aiming pads. The handle of shaft 64 is then moved toward the headlamp by an operator manually to expel air between the vacuum cup and the headlight lens as the vacuum cup is deformed in contact with the lens of the headlamp. The piston 62 assumes the position shown in FIG. 10 as the vacuum cup 51 is placed in flushing contact to the lens. Thereafter, the handle is released by the operator causing the piston to move slightly to the right from the position shown in FIG. 10. This movement of the piston causes suction of any air left between the headlamp lens and the vacuum cup into cylinder 61 and the instrument is secured in proper position. To remove the instrument after use, the shaft 64 is pulled away from the headlight thus breaking the seal between the protruding portion, 65 and piston 62 allowing air to enter the vacuum chamber and the piston 62 to be moved by spring 69 to its original position as shown in FIG. 9, to release the vacuum cup from the headlight lens.

Figure 5:
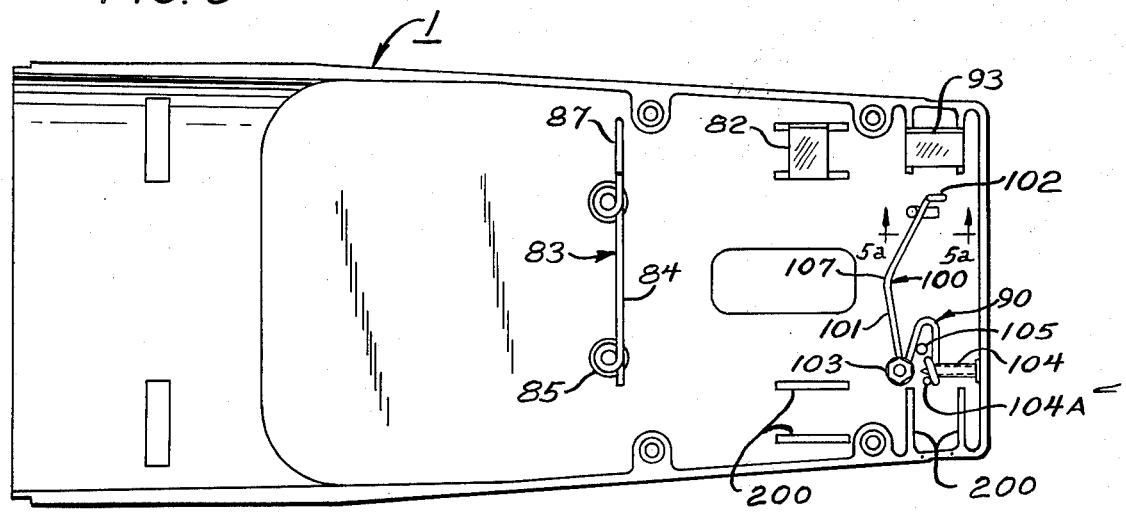
FIG. 5 is a top schematic illustration of the lower portion of the headlight instrument of FIG. 3.

Referring now to FIGS. 3, 4, 5 and 6 there is illustrated the slight mechanism utilized in instrument 1 to accomplish vertical aiming of the headlamp. The sight means includes a viewing opening 80 located in the top of the housing at close proximity to spirit level 22 and a sight opening 81 is formed in longitudinal alignment through cup 40 at end 3a of the housing as shown in FIG. 6. As shown in FIG. 5, a mirror 82 in a sloped orientation is positioned beneath the viewing opening 80 so that the sight opening 81 is in view from the top of the instrument.

The sight means including viewing opening 80 is utilized to adjust the instrument according to the slope of the ground upon which the vehicle having headlights being tested rests. The sight means includes a sight element 83 which is interposed in line of sight between viewing opening 80 and sight opening 81. The sight element comprises an elongated wire 84 which is wrapped in surrounding relationship to two screws 85 and 86 positioned and attached to the bottom of the housing. The two screws are aligned perpendicularly to the longitudinal axis of the instrument and the sight wire extends between two screws. The sight wire 84 includes an end projection from screw 86 comprising a bent portion forming two parallel sight elements 87 horizontally disposed to project into the line of sight as shown in FIGS. 5 and 6. To align the sight wire elements 87 with a target, a horizontally disposed wire 88 is attached to the wall of cup 40 and extends partially across opening 81 at the vertical midpoint thereof.

The calibration of the instrument according to the slope of the ground is accomplished by placing the instrument being calibrated adjacent the front wheel of a vehicle with its longitudinal axis parallel to the longitudinal axis of the vehicle. Each of the instruments includes a horizontal target 89 which is a painted line, adhesive strip or the like attached to one exterior side of the housing 3 at enlarged end 3a at an elevation corresponding to sight wire 88 as shown in FIG. 4 and FIG. 6. Thus, other instrument is positioned perpendicular to the longitudinal axis of the vehicle to permit the target 89 to be viewed from the device being calibrated. Other relative positions may be selected to calibrate the instrument but it is convenient that the wheels of the vehicle be used as reference points. The operator having placed instrument being calibrated at the front wheel observes the target on the other instrument positioned at the back wheel. If the instrument being calibrated is in proper alignment with the target, the two parallel sight elements 87 and sight wire 88 will be aligned with target 89 as viewed from opening 80. If these elements are not in alignment, as to height screw 13 is adjusted to tilt housing 3 upward or downward to the extent necessary to optically align the elements. Upon aligning the elements, the optical path of the instrument is then parallel to the slope of the ground.

It should be apparent that after aligning the target and sight means the bubble 22a of level 22 may not be at a zero position. Therefore, the calibration of the instrument is completed by adjusting screw 27 upon the top of the instrument which shifts the orientation of the spirit level to return the bubble to a zero position. After the bubble is returned to zero, the instrument is now calibrated according to the slope of the ground and may be attached to a headlamp to make the vertical adjustment thereof after the second instrument is similarly calibrated. If the bubble of the spirit level still registers at a zero position when instrument 1 is attached to a headlamp, then the vertical orientation of the headlamp is parallel to the ground. If a deviation from a parallel direction of the beam exists, the bubble will correspondingly move from a zero point. In the event the deviation is too great for desired direction of the beam, the vertical adjusting screws of the headlamp are manipulated to shift the longitudinal axis of the lamp to a desired orientation indicated by spirit level 22 which may be a slight depression of the beam toward the ground, a level position or other selected direction.

The horizontal or sideway orientation of headlamp is tested an adjusted by means of a lateral directed sight system 90 incorporated in the apparatus of the invention. A sideward viewing system of each instrument 1 permits the viewer to view a vertical target line 91 as illustrated in FIG. 4 positioned on the other instrument while both instruments are mounted on respective headlights. The lateral sight system includes a top viewing window 92, a slope mirror 93 mounted directly beneath the viewing window 92 in attachment to the housing by suitable mountings. The mirror is aligned with a side sight window 94 which permits the viewer to view through window 92 the adjacent instrument along a line of view transverse to the longitudinal axis of the instrument. The target 91 on the other instrument is oriented in a vertical plane in vertical alignment with sight window 94.

Figure 5A:
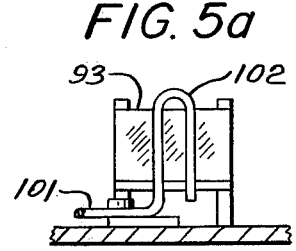
FIG. 5a is an enlarged schematic elevation view taken along line 5a—5a of FIG. 5.

To accomplish the desired sideward or horizontal adjustment of the headlamp, a side sight means 100 is attached to the bottom of the housing 3. Sight means 100 includes an elongated wire 101 having two spaced parallel viewing elements 102 mounted on an end thereof wherein the two spaced elements 102 extend in a vertical orientation perpendicular to other portion of wire 101 as best shown in FIG. 5a . Sight wire 101 is attached to the bottom of the housing by means of a screw and nut arrangement 103 whereby the wire is wrapped around the screw and attached to the housing by the nut. One end portion of the wire 101 is bent to create a biasing force and is attached to a second horizontal screw 104 connected to the side wall of the housing. The second horizontal screw 104 supports the end of sight wire 101 by the wire being wrapped around the screw and an end 104a of the wire extends upward in a vertical orientation to extend into the optical path of sight system 100 for visual alignment with viewing elements 102. The other portion of the wire extends in horizontal disposition from screw 103 with a slight U-shaped configuration to form an apex 107 directly in alignment with central longitudinal axis of the instrument. The end of the wire is bent to form the parallel sight elements 102 which are interposed in the optical path of the lateral viewing means.

To achieve a sideward or horizontal directing of the headlight beam, the operator observes the image created by target 91 of the first instrument through windows 92 and 94 for alignment with the gap between the two vertical aiming elements 102 of the wire 101 and in alignment with the vertical portion 104A of the wire. If the sideward adjustment of the headlamp is improper, then the conventional horizontal adjustment screws of the lamp are adjusted to move the headlamp along a horizontal plane to a position where the target of the opposite aligned instrument is aligned with the sight elements of the instrument mounted on the headlight being adjusted. A similar operation is then performed on the other headlamp to test its sideward or horizontal adjustment.

Figure 11:
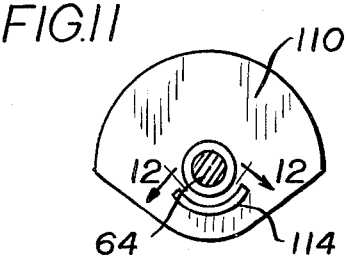
FIg. 11 is an end schematic illustration of the adjusting knob of the instrument taken along line 11—11 of FIG. 10.
Figure 12:
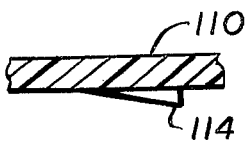
FIG. 12 is a partial section schematic illustration taken along line 12—12 of FIG. 11.

It is often desirable that the right or left headlight of a vehicle be directed in a sideward orientation with respect to the longitudinal axis of the vehicle to increase the illumination of a highway or for safety reasons. Such selected sideward directing of the beam is accomplished by the invention by untilizing a calibrating knob 110 as shown in FIGS. 3, 11, and 12. The calibrating knob 110 is rotatably mounted on shaft 64 and possesses a semi-circular configuration having an upper radius such that the upper portion of the calibrating disc extends above the top surface of teh housing through an adjustment hole 111 therein. The upper surface of the knob is serrated to permit easy rotation and calibrated indicia may be positioned on the disc for predetermined adjustments. A guard 113 is mounted adjacent one side of the calibrating knob to function as a protective guard.

The bottom of the knob is of a size to enable the member to fit for rotation within the confines of the interior of the bottom of housing 3. A selected angular horizontal or sideward adjustment of the headlight is accomplished by effecting movement of the sight elements 102 relative to sight window 92 in a longitudinal direction. such movement of the sight elements 102 is produced by rotation of the knob 110 wherein the knob includes a partial circumferential cam 114 protruding helically in an axial direction from the surface of the cam. It should be apparent that rotation of the knob moves the cam relative to apex 107 to effect a selected movement of the wire 101 including sight elements 102.

By selectively moving sight element 102, the direction of alignment between sight element 102, vertical portion 104a and targer 91 is altered to achieve a predetermined orientation in a horizontal plane. Thus, the headlamp may be tested for an orientation in which the longitudinal axis of the headlamp is parallel to the longitudinal axis of the vehicle or for a desired left or right deviation therefrom. If during testing target 91 does not align with sight element 102 and vertical portion 104a, then the horizontal adjustment screws of the headlight are adjusted until alignment is acheived. Prior to the instrument being attached to a headlamp, the lateral sight system 90 may be initially calibrated, if necessary, by rotating screw 104 shifting vertical portion 104a in a longitudinal direction as a test target (not shown) is being viewed.

As described previously, the apparatus of the invention utilizes two instruments which are substantially identical to adjust respective headlights upon a vehicle. The particular instrument illustrated in FIG. 3 is adapted to be attached to a headlamp positioned on the left side of the vehicle, since the sideward sight window should face the other instrument. Similarly, the other instrument utilized in conjunction with the invention would then be identical to the structure as illustrated in FIG. 3 with the exceptions that the viewing windows would be on the opposite sides thereof so that the sideward sight window is facing the other instrument, that mirrors would be attached alternative supports 200, and that sight element 80 and associated structure would be oriented in the opposite direction. Thus, the orientation of the sight system in the two instrument are opposite so that the respective sight windows face the other instrument during attachment to a headlamp lens. To aid in reducing the cost of manufacture of the instrument, the cup member as shown in FIG. 6 is formed with two sight openings so that such a cup member can be used with either instruments during manufacturing operations.

Referring to FIGS. 9 and 10, the vacuum assembly 50 of the invention includes an indicating feature to warn an operator or user of an impending fall of an instrument from a secured position on a headlamp. If the seal between the headlight lens and vacuum cup is broken or leaks, the instrument may drop to the floor or ground to cause damage to the device. In vacuum assembly 50, as a leak in the seal of vacuum cup 51 occurs, fluid pressure commences to enter passage 53 and in conjunction with force of spring 69, causes piston 62 to move slowly to the righ viewing FIG. 10 and thus the handle 64a and shaft 64 move outward from the housing. Such movement of the handle is noted by the user of the instrument and as the handle reaches a predetermined outward position, a warning is given to the operator that the vacuum seal of cup 51 is insufficient and the instrument is in danger of falling from position. If desired, an index mark (not shown) may be affixed to the shaft 64 at a predetermined longitudinal position thereof which corresponds to the outward position where falling of the instrument is likely.

In the above description there has been disclosed an improved apparatus for testing the adjustment of headlights. For convenience of illustration, the spirit level assembly has been described with reference to the structure shown in FIG. 7 and FIG. 8, but it is within the scope of the invention to utilize any means to support the spirit level which accomplishes the desired adjustability of the spirit level as provided in the invention. Moreover, although the invention has been described with reference to the vacuum assembly shown in reference to FIGS. 9 and 10, it is also within the scope of the invention to utilize other vacuum cup assemblies if desired.

While the invention has been described with reference to a preferred embodiment, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teaching.

What is claimed is:

1. An apparatus for testing the adjustment of a headlamp of a vehicle resting on a support surface comprising
    a housing including securement means adapted to secure the housing to the lens of a headlamp of a vehicle with the longitudinal axis of the housing coinciding to the longitudinal axis of the headlamp,
    a spirit level mounted on the housing with its longitudinal axis parallel to the longitudinal axis of the housing in a horizontal plane,
    adjustment means coupled to the spirit level for shifting the longitudinal axis of the spirit level relative to the housing to a horizontal orientation while the housing is positioned on the support surface with its longitudinal axis parallel to the longitudinal axis of the vehicle,
    said spirit level being shifted by the adjustment means indicating the degree of vertical adjustment of the headlamp upon the housing being secured to the headlamp,
    said vertical orientating means including a sight means having an optical path oriented longitudinally of the housing for indicating the relative alignment of the longitudinal axis of the housing to the slope of the ground prior to attachment to the headlamp,
    said sight means including an opening positioned on an end of the housing and a second opening positioned on the top of the housing,
    the housing further includes lateral sight means to indicate the horizontal alignment of the headlamp, and
    the lateral sight means having an optical path including a view opening to provide an image external of the housing and further including a second opening positioned on said housing in confrontation to an external target, and
    said lateral sight means including a sight member and a sight element coupled to the housing and lying in spaced relationship along said optical path.

2. The apparatus of claim 1 wherein said securement means includes a flange surface disposed in a plane normal to the longitudinal axis of the housing adapted to abut aiming surfaces of a headlight.

3. The apparatus of claim 1, wherein said vertical orienting means further includes shifting means for elevating one end of the housing relative to the other end to shift the longitudinal axis of the housing parallel to the slope of ground.

4. The apparatus of claim 1 wherein said securement means includes a cup member having a surface adapted to be attached to the lens of a headlamp.

5. The apparatus of claim 4 wherein said surface is coupled to a source of suction for securement of the cup member to the headlight.

6. An apparatus for testing the adjustment of a headlamp of a vehicle comprising a housing having an end adapted to be attached to a headlamp of a vehicle said end of the housing including securement means adapted to secure the housing to the headlamp with the longitudinal axis of the housing coinciding with the longitudinal axis of the headlamp, said housing further including lateral viewing means for indicating the horizontal alignment of the headlamp, said lateral means having a viewing path including a viewing opening to provide an image external of the housing and a second opening optically coupled to the viewing opening and positioned on said housing in confrontation to an externally positioned target, said viewing path extending in a direction substantially transvere to the longitudinal axis of the housing, sight means attached to the housing and interposed in the viewing path to align the target with a predetermined position of the viewing opening and second opening, said sight means includes a sight element extending into the optical viewing path, and adjustment means coupled to the sight element to effect movement thereof to vary the predetermined position for selected variable horizontal adjustment of the headlamp.

7. The apparatus of claim 6 wherein said sight element extends vertically into the optical viewing path.

8. The apparatus of claim 7 wherein said adjustment means includes a rotatably mounted adjustment knob.

9. The apparatus of claim 8 wherein said adjustment knob includes a helical cam of variable height, said sight means being resiliently biased against said cam whereby rotation of said knob effects movement of the sight element.

10. The apparatus of claim 6 further including reflecting means positioned on the housing for optically coupling the viewing window and the second opening.

11. The apparatus of claim 10 wherein said viewing window is positioned on an upper surface of the housing and the second opening is positioned on a side wall of the housing.

12. The apparatus of claim 6 wherein said sight means includes a second sight member spaced from the sight element and vertically extending into the optical viewing path.

13. The apparatus of claim 12 further including adjustable mounting means coupled to the sight member to selectively move the member in a direction transverse to the optical viewing path to calibrate the sight means.

14. An apparatus for testing the adjustment of a headlamp of a vehicle comprising a housing having an end adapted to be attached to a headlamp of a vehicle, said end of the housing including securement means adapted to secure the housing to the headlamp with the longitudinal axis of the housing coinciding with the longitudinal axis of the headlamp, said securement means including an attachment element to contact the headlamp, said securement means further including actuator means operatively coupled to the attachment element to selectively reduce the pressure to a predetermined level between the headlamp and attachment element for attachment.

said actuator means including an actuator shaft extending outward from the housing and adapted to attain a predetermined position relative to the housing when said housing is attached to the headlamp, and means responsive to a rise of pressure between the headlamp and attachment element to move the actuator element from said predetermined position upon said pressure rising to a selected magnitude above said predetermined rising to a selected magnitude above said predetermined level to indicate that the attachment to the headlamp is inadequate to support the housing.

* * * * *

UNITED STATES PATENT OFFICE
CERTIFICATE OF CORRECTION

Patent No. 3,898,742                    Dated August 12, 1975

Inventor(s) Wayne E. Hunnicutt

It is certified that error appears in the above-identified patent and that said Letters Patent are hereby corrected as shown below:

In column 2, line 42, the word "targer" should be --target--.

In column 3, line 59, after the word "of" insert "the".

In column 3, line 61, after the "of", (first occurrence), insert -- the housing --.

In column 4, line 20, the word "Ushape" should be -- U-shape --.

In column 4, line 26, the word "inches" should be -- includes --.

In column 6, line 3, the reference numeral "74" should be -- 64 --.

In column 6, line 10, the word "the" (second occurrence) should be --a --.

In column 7, line 2, before the word "other", insert -- the --.

In column 7, line 42, the word "an" should be -- and --.

In column 8, line 42, the word "teh" should be -- the --.

In column 8, line 55, the word "such" should be -- Such --.

In column 8, line 65, the word "targer" should be -- target -

UNITED STATES PATENT OFFICE
CERTIFICATE OF CORRECTION

Patent No. 3,898,742     Dated August 12, 1975

Inventor(s) Wayne E. Hunnicutt

It is certified that error appears in the above-identified patent and that said Letters Patent are hereby corrected as shown below:

In column 10, line 57, the "," should be omitted.
In column 12, lines 38 and 39, the words "rising to a selected magnitude above said predetermined" should be deleted.

Signed and Sealed this thirtieth Day of December 1975

[SEAL]

Attest:

RUTH C. MASON
Attesting Officer

C. MARSHALL DANN
Commissioner of Patents and Trademarks